United States Patent [19]

Farinacci et al.

[11] Patent Number: 5,325,941

[45] Date of Patent: Jul. 5, 1994

[54] COMPOSITE BRAKE ROTORS AND CLUTCHES

[76] Inventors: Michael F. Farinacci, 4680 Willocroft Rd., Willoughby, Ohio 44094; William D. Garner, Rte. #1, Box 1551, Edgewood, Tex. 75117

[21] Appl. No.: 887,185

[22] Filed: May 21, 1992

Related U.S. Application Data

[63] Continuation-in-part of Ser. No. 580,932, Sep. 11, 1990, abandoned.

[51] Int. Cl.$^5$ .......................... F16D 65/10; B22F 7/02
[52] U.S. Cl. .......................... 188/218 XL; 192/107 M; 188/251 M; 188/264 A
[58] Field of Search ....... 188/218 R, 218 XL, 251 M, 188/73.1; 192/107 M; 428/614

[56] References Cited

U.S. PATENT DOCUMENTS

| | | | |
|---|---|---|---|
| 2,372,984 | 4/1945 | Pierce | 188/218 X |
| 2,938,790 | 5/1960 | Stedman et al. | 188/251 M |
| 3,114,197 | 12/1963 | DuBois et al. | 75/229 |
| 3,371,756 | 3/1968 | Spitz | 188/251 M |
| 3,434,998 | 3/1969 | Aldrich | 188/251 M |
| 3,703,224 | 11/1972 | Bray | 188/251 M |
| 3,791,493 | 2/1974 | Yamaguchi et al. | 188/251 M |
| 3,885,959 | 5/1975 | Badia et al. | 428/614 |
| 4,119,591 | 10/1978 | Aldrich | 188/251 M |
| 4,134,759 | 1/1979 | Yajima et al. | 428/614 |
| 4,290,510 | 9/1981 | Warren | 192/107 M |
| 4,311,524 | 1/1982 | Genkin et al. | 188/251 M |
| 4,350,530 | 9/1982 | Kamioka | 75/231 |
| 4,415,363 | 11/1983 | Sanftleben et al. | 188/251 M |
| 4,420,067 | 12/1983 | Yamamoto et al. | 188/251 M |
| 4,438,004 | 3/1984 | Myers | 188/251 M |
| 4,618,049 | 10/1986 | Pflaüm et al. | 192/107 M |
| 4,759,995 | 7/1988 | Skibo et al. | 428/614 |
| 4,786,467 | 11/1988 | Skibo et al. | 428/614 |
| 4,815,572 | 3/1989 | Froberg et al. | 188/251 M |
| 4,926,978 | 5/1990 | Shibata et al. | 188/251 M |

*Primary Examiner*—Robert J. Oberleitner
*Assistant Examiner*—Chris Schwartz

[57] ABSTRACT

The present invention is directed toward a combination of composite brake rotors or clutches and a brake pad where the composite rotor or clutch is composed of a low density metal and particles of a nonmetallic material. Specifically the rotors or clutches are comprised of a metal matrix comprising aluminum or magnesium or alloys thereof homogenously mixed with a refractory ceramic, such as silicon carbide, silicon nitride, boron nitride or aluminum oxide among others. The composite brake rotors and clutches are very durable and have greatly increased thermal conductivities which improve brake and clutch performance. The rotors or clutches are manufactured by casting, followed by diamond cutting and finally followed by surface burnishing to smooth and condition the surface of the rotor or clutch. The brake pad may be comprised of at least cupric oxide, antimony sulfide, silicon alumina alloy, barium sulfate, kevlar, zinc sulfide, coke, and graphite.

1 Claim, 1 Drawing Sheet

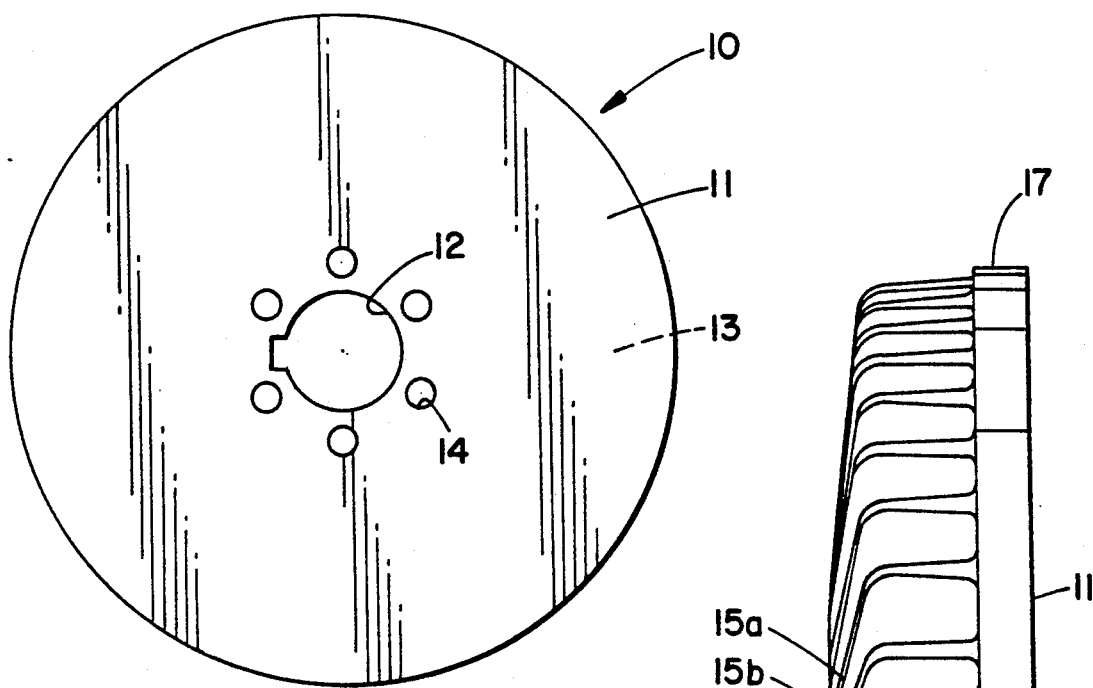
FIG. 1
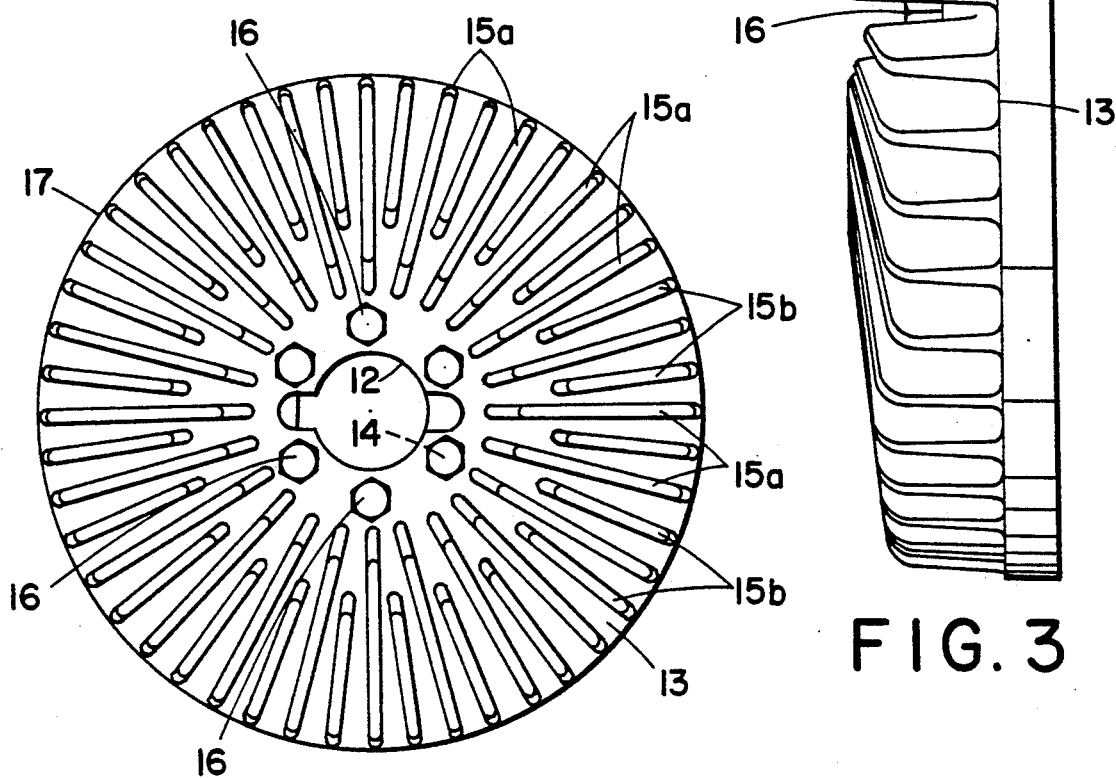
FIG. 2
FIG. 3

COMPOSITE BRAKE ROTORS AND CLUTCHES

This application is a continuation-in-part of Ser. No. 580,932 filed Sep. 11, 1990, now abandoned.

TECHNICAL FIELD

The present invention relates to a brake rotor or a clutch. Particularly, it relates to a brake rotor or a clutch having an engagement face and an opposed face adapted for enhanced heat transfer. More particularly, it relates to a brake rotor or a clutch comprising a composite of a low density metal and particles of a nonmetal which is adapted to minimize adverse effects of galling on the engagement or braking surfaces of the rotor or clutch and to increase the heat flow away from the brake or clutch pad. The composition also greatly enhances the heat dissipation propensity of the rotor or clutch and has a relatively low density.

BACKGROUND OF THE INVENTION

Brake rotors and clutches have been the subject of a variety of patents. The engagement surfaces of a brake rotor and clutch have typically been made of an iron-bearing metal, such as cast iron, steel or stainless steel. Many patents have been related to specific rotor or clutch designs, geared toward elimination of galling and build up of material on the engagement surfaces.

Recently, McMurray in U.S. Pat. No. 4,756,392 described a stainless steel rotor having depressions on the braking surface which act to minimize galling.

Although much work has been done in the area of brake rotors and clutches, new lightweight metallic composites have not made inroads in this area. In fact, the nature of the material has lead those skilled in the art away from using such composites for this application, due to the abrasiveness of the material. Historically, abrasive materials did not make desirable friction surfaces.

BRIEF DESCRIPTION OF THE DRAWINGS

FIG. 1 shows a top plane view of a brake rotor or clutch of the present invention.

FIG. 2 is a hollow plane view of the brake rotor of FIG. 1.

FIG. 3 is a side view of the brake rotor of FIG. 1.

SUMMARY OF THE INVENTION

It is the principal object of the present invention to provide a composite comprising a low density metal or metal alloy and particles of a nonmetallic material for use in brake rotors and clutches.

A further object of this invention is to provide a composite brake rotor or clutch, characterized by high structural stability and strength, which minimizes adverse effects due to galling and enhances the thermal conductivity of the rotor, in order to allow more efficient thermal heat dissipation during braking or engagement, which reduces brake and clutch pad damage.

Another object of the present invention is to provide a composite rotor or clutch with the character described herein, which is integrally formed from a single casting in a size and weight that is compatible with existing disk brake assemblies or clutch assemblies for automobiles, industrial machinery, race cars, airplanes, or other types of machinery or vehicles which require braking and clutching action.

Another object of this invention is to provide a composite brake rotor or clutch where the surface of the rotor or clutch is cut by a diamond cutting tool to make a sufficiently smooth surface for adequate braking and clutching.

Another object of the present invention is to provide a composite brake rotor or clutch which is substantially lighter in weight than conventional rotors or clutches and will, therefore, have a positive effect on fuel economy when utilized on motorized vehicles.

Another object of the present invention is to provide a composite brake rotor or clutch where the surface is burnished using a ceramic cutting tool.

A still further object of this invention is to provide a composite comprising from about 95% to about 50% of a low density metal by weight and from about 05% to about 50% of particles of a nonmetallic material by weight.

A still further object of this invention is to provide a composite where the nonmetallic material is a refractory ceramic.

The rotor member of the present invention for frictional coupling with at least one stator member which includes both brakes and clutches, comprises a first surface, normal to the axis of rotation of said member, said surface being specially smoothed for frictional coupling with said stator member or members and a second surface longitudinally opposed to said first surface and where said rotor member is comprised of a material having a thermal conductivity in excess of 75 Btu/hr ft ° F.

The second surface can further comprise a means for enhanced heat transfer integral thereto. The heat transfer means is preferably a plurality of fins integrally a part of the rotor. However, other heat transfer means are also usable including rod-like protrusions and the like.

The brake rotors and clutches of the present invention comprise a composite of a low density metal and particles of a nonmetallic material. The composite comprises from about 50% to about 95% of the low density metal by weight and about 50% to about 5% of particles of the nonmetallic material by weight. Preferably, the composite comprises from about 70% to about 85% of the low density metal by weight and about 30% to about 15% of particles of the nonmetallic material by weight.

The low density metals useful in the present application can be selected from the representative and illustrative group consisting of aluminum, aluminum alloys, magnesium, magnesium alloys and a mixture thereof. Preferably, the low density metal is an aluminum alloy while the nonmetallic material is a refractory ceramic which can be selected from the representative and illustrative group consisting of a metal oxide, metal nitride, metal carbide, metal silicides and mixtures thereof. Preferably, the nonmetallic material is selected from the group consisting of silicon carbide, aluminum oxide, boron carbide, silicon nitride, and boron nitride. In particular, the nonmetallic material is selected from the group consisting of silicon carbide and aluminum oxide.

The composition is characterized by high strength and high heat conductivity which allows fast and efficient removal of heat away from the contact surface between the brake rotor and the brake pad. Improving the conduction of heat away from the contact surface is thought to increase the brake pad longevity and reduce brake pad operating temperature during braking. The reduced brake pad temperature is also thought to reduce brake fluid boiling problems in the brake lines leading to the braking assembly. Such heating is thought to result in brake fading as well as failure, after long and sustained brake operation.

These improvements are especially critical in race car and airplane braking systems. The same improvements also improve clutch behavior and durability.

The heat conductivity of the present composite is about four times that typically found for cast iron rotors or clutches. The composition is extremely durable and requires cutting of the rotor or clutch surface using a diamond cutting tool.

In a second embodiment of the present invention, the brake rotor or clutch is made in such a way that the engaging surface of the rotor or clutch is made of a more highly nonmetallic material loaded composite than the non-engaging surface or heat dissipation means. This embodiment can be made by either casting the non-engaging portion of the rotor or clutch using a pure metal, or by using a composite with a smaller ratio of nonmetallic material, followed by casting the engaging surface, which is made of the composite taught previously. The composite useable for the non-engaging portion of the rotor or clutch can comprise from about 85% to about 100% of the metal and from about 15% to about 0% of the nonmetallic material with a 100% composition being preferred.

The second embodiment can also be prepared by casting the rotor or clutch in such a way that the engaging surface of either the clutch or rotor is in the bottom of the mold. The composites useful in this invention must be continuously stirred during casting or the non-metallic material will settle because it is heavier than the metal. One can take advantage of this settling phenomenon to cast the rotor or clutch by casting and allowing a period of settling without stirring then rapidly quenching the rotor or clutch.

The preferred mode of manufacturing comprises the steps of casting a brake rotor or clutch out of the composite, rough finishing a surface of the brake or clutch, and fine finishing the surface of the brake rotors or clutch. The preferred rough finishing step utilizes a diamond cutting tool to machine the surface to about 0.010 inches of the finished surface. The two finishing steps are preferably made with an 80 degree tool at from about 500 RPM to about 600 RPM with a feed rate from about 0.005 to about 0.020 inches with from about 0.080 to about 0.012 inches being preferred. The preferred fine finishing step is a burnishing step which utilizes a ceramic cutting tool to smooth the diamond cut surface and to expose the ceramic particles on the surface. The casting temperature is from about 660° C. to about 850° C.

The casting step is preferably performed with continuous stirring of the composite. This stirring is necessary to prevent the nonmetallic material from settling, which cause inhomogeneities in the composite. Typically, the composite is stirred just prior to pouring the composite into a mold of a given size and dimension.

The brake rotors of the present invention can be used in any braking assembly typically known in the art, including single braking assemblies using one rotor surface and/or multiple diametrically opposing assemblies using two or more rotor surfaces. The brake rotors can be finned or non-finned where finning increases the heat dissipation propensity of the brake rotor. This invention can also be used in any disk brake application or drum brake application where the drum is made of the composite.

Clutches made from the present composite can be used in any type of motorized vehicle or machinery, for engaging and disengaging the drive device.

Besides fins, the brake rotors of the present invention can have cored slots for better heat dissipation at the rotor surface or holes or depressions in the surface to help dissipate heat and to keep the surface clean and ungalled.

DETAILED DESCRIPTION

Brake rotors and clutches known in the prior art are generally comprised of a heavy material having a relatively high heat capacity and capable of having a hardened surface imposed thereon for use as the frictional engagement surface. In such cases, the mass of the rotor or clutch tends to act as a heat sink or, the heat generated at the frictional face and the conductivity of the thermal energy away from the frictional face is not critical.

Some lighter metals, such as aluminum, which would normally be attractive for use as rotors, have been considered unacceptable, due to inferior thermal strength, hardness or combination of both. Newer materials, such as composite materials containing nonmetallic particles in a metallic matrix, present a potential for new solutions to this problem.

The composites of the present invention are generally made by dispersing the particulate non-metallic material in the molten metal under agitation. Preferably, the useful material is a composite of non-metallic refractory ceramic particles in a metallic matrix, according to the procedure disclosed in U.S. Pat. No. 4,786,467 to Skibo et al. My invention material, when cast from aluminum alloy A356 with 20% silicon carbide, has a measured density of 0.0996 pounds per cubic inch or 2.76 grams per cubic centimeter. This is comparable to a density of approximately 7.86 grams per cubic centimeter for cast iron.

An additional interesting property of such composite materials is the higher thermal conductivity. For example, the above material exhibits a thermal conductivity that is on the order of four times greater than thermal conductivity of cast iron. Generally, the thermal conductivity, that is the ability of the material to conduct heat away from the point of heat generation, is such that heat dissipation from the object is limited by the ability of the heat to be conducted through the material. For example, plain carbon steel has a thermal conductivity of 30 Btu/hr ft ° F.; stainless steel 304 has a thermal conductivity of 10 Btu/hr ft ° F.; ductile cast iron ASTM A339, A395 has a thermal conductivity of 10 Btu/hr ft ° F.; aluminum alloy 3003 ASTM B221 has a thermal conductivity of 90 Btu/hr ft ° F.; and aluminum alloy 2017 (annealed) ASTM B221 has a thermal conductivity of 95 Btu/hr ft ° F.

For increased thermal conductivity of a composite material, the limiting factor is no longer the thermal conductivity of the material, but becomes the ability of the physical shape to dissipate the heat transmitted by means of convection or radiant heat transfer. Therefore, although fins and other heat transfer enhancing means are known in connection with the cast iron rotors, the limitations of thermal conductivity are such that the addition of such features are not readily utilized.

Under the present invention, the inventors have found that the heat dissipation can be made limiting upon the conduction to the environment at the opposing surface rather then by the thermal conductivity of the material.

Referring now more specifically to the drawing, FIGS. 1-3 show differing views of a brake rotor generally 10 with machined top or first surface 11. Top surface 11 is smoothed by burnishing and is adapted to engage the brake pads or clutch pad in a frictional manner to allow either braking or movement. A keyed aperture 12 extends from top surface 11 through to back surface 13. The keyed aperture 12 is adapted for attaching the brake assembly to the axle of the moving vehicle. Apertures 14 are adapted to allow bolts for attachment to a hub of said rotor to the brake assembly to pass therethrough.

It should be understood that the invention contemplates that essentially any brake pad or clutch pad that is available on the market would work in conjunction with the improved rotor of the invention, but simple testing would quickly show whether one pad would work better than another, both from wear rate and frictional coefficient. A typical brake or clutch pad contains four types of ingredients:

1. Binder—typically a phenolic resin, polyamides, polyimides, acrylics, teflons, etc.
2. Fibers—such as asbestos, glass, Kevlar, graphite, steel wool and synthetic organic fibers such as polyethylene, polyester and nylon.
3. Organic particles—such as ground nut shells and resin particles.
4. Inorganic particles—such as silica, barium sulfate, brass and steel particles and ZEEOSPHERES, as made by Zeelan Industries, Inc. of St. Paul, Minn.

Normally a blend of several filler materials is used, which blend includes some hard and some soft particles to balance friction properties.

It has been noted that the Zeeospheres tend to improve flow in molding or pre-molding operations with a result in fewer rejects, and a brake pad with a more uniform density.

I have found that a particular friction material formulation tends to produce somewhat better results in connection with the metal matrix aluminum rotor, than the conventional off-the-shelf pads, and hereinbelow list the particulars of this basic foundation formula, as follows:

| FRICTION MATERIAL FORMULATION FOR METAL MATRIX ALUMINUM ROTOR | | |
|---|---|---|
| MATERIAL | % BY WEIGHT | SOURCE |
| CUPRIC OXIDE | 15 | SCM METAL PROD. |
| ANTIMONY SULFIDE | 2 | ANZON CORP. |
| ZEEOSPHERES 600 (Silica-Alumina Alloy) | 10 | ZEELAN IND., INC. |
| BARIUM SULFATE XF (Barytes) | 30 | |
| KEVLAR PULP 302 | 4 | DUPONT |
| PHENOLIC BINDER RESIN (NC-126) | 20 | CARDOLITE CORP. |
| (CASHEW) FRICTION PARTICLE (106-20) | 10* | CARDOLITE CORP. |
| ZINC SULFIDE | 3 | |
| PETROLEUM COKE | 6 | AIRCO CARBON |

*POLYMERIZED PHENOLIC FRICTION MODIFIER

This formula serves as a basic foundation formula upon which to build. Any one of the above ingredients can be altered to achieve different characteristics good and bad, or be left out.

The range for the various ingredients in the above formula can vary, and it is believed that the ranges which can be suitable are as follows:

| MATERIAL | % BY WEIGHT |
|---|---|
| CUPRIC OXIDE | 10-25 |
| ANTIMONY SULFIDE | .5-4 |
| ZEEOSPHERES | 5-20 |
| BARIUM SULFATE | 20-40 |
| KEVLAR PULP | 0-5 |
| PHENOLIC RESIN | 12-20 |
| FRICTION PARTICLE | 5-15 |
| ZINC SULFIDE | 1-5 |
| PETROLEUM COKE | 1-10 |

Material amounts can vary based on grade, Particle size, purity, etc. The above range varies per formula.

FIG. 2 shows a bottom view of a finned brake rotor with back surface 13 or second surface of rotor 10. Radially disposed fins 15a and 15b are integrally associated with surface 13. Fins 15a extend radially from a point near to apertures 14, while fins 15b extend from a more interior portion to the edge 17 of rotor 10. Bolts 16 hold rotor 10 to the brake assembly.

FIG. 3 is a side view of the finned brake rotor of FIG. 2. Fins 15a and 15b generally extend radially from near apertures 14 housing bolts 16 of the rotor outward to edge 17 of rotor 10.

Surface 11 can also have a variety of thermal dissipation aids formed thereon and therein such as grooves or cores, holes or channels.

While in accordance with the patent statutes, the best mode and preferred embodiment of the invention have been described, it is to be understood that the invention is not limited thereto, but rather is to be measured by the scope and spirit of the appended claims.

What is claimed is:

1. A rotor member and brake pad assembly for frictional coupling in a brake or a clutch, said rotor member comprising:

a first surface, normal to the axis of rotation of said member, said surface being specifically smoothed for frictional coupling, a second surface longitudinally opposed to said first surface; and said rotor member comprised of a homogeneous material having a thermal conductivity in excess of 75 BTU/hr ° F., wherein the homogeneous material is comprised of a composite comprising a low density metal and a non-metallic material, wherein the low density metal is selected from the group consisting of aluminum, and aluminum alloy, magnesium, a magnesium alloy and a mixture thereof, wherein the non-metallic material is a refractory ceramic selected from the group consisting of a metal oxide, metal nitride, metal carbide, metal silicides and mixtures thereof, and wherein the composite comprises about 50% to about 85% by weight of the low density metal and from about 50% to about 15% by weight of the non-metallic material, said brake pad comprising cupric oxide, antimony sulfide, silicon alumina alloy, barium sulfate, kevlar, zinc sulfide, coke, and graphite.

* * * * *